F. TAYLOR.
DEMOUNTABLE RIM AND FELLY STRUCTURE.
APPLICATION FILED OCT. 25, 1915.

1,262,139.

Patented Apr. 9, 1918.
2 SHEETS—SHEET 1.

Witnesses:
A. L. Lord
D. Tozer

Inventor.
Fred Taylor,
by B.W.J. Brockett
Atty.

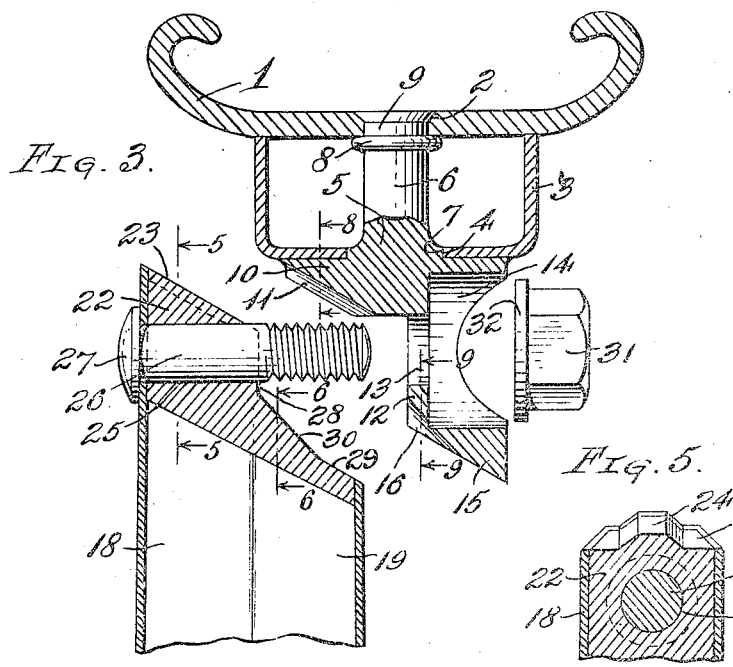

UNITED STATES PATENT OFFICE.

FRED TAYLOR, OF CLEVELAND, OHIO.

DEMOUNTABLE RIM AND FELLY STRUCTURE.

1,262,139.

Specification of Letters Patent.  Patented Apr. 9, 1918.

Application filed October 25, 1915. Serial No. 57,697.

*To all whom it may concern:*

Be it known that I, FRED TAYLOR, citizen of the United States, residing at Cleveland, in the county of Cuyahoga and State of Ohio, have invented certain new and useful Improvements in Demountable Rim and Felly Structures, of which the following is a specification.

This invention relates generally to wheels, and particularly to connecting means between the rim and felly and the web or spoke structure.

More specifically the invention relates to a metal wheel comprising a web made up of sheet metal stampings secured together, a rim, a felly, secured to the rim, and suitable demountable connections between members attached to the felly and the ends of the spokes whereby the parts are firmly held in place to form a substantial wheel structure.

The invention may be further briefly summarized as consisting in the construction and combination of parts hereinafter set forth in the following description, drawings and claims.

Figure 1:
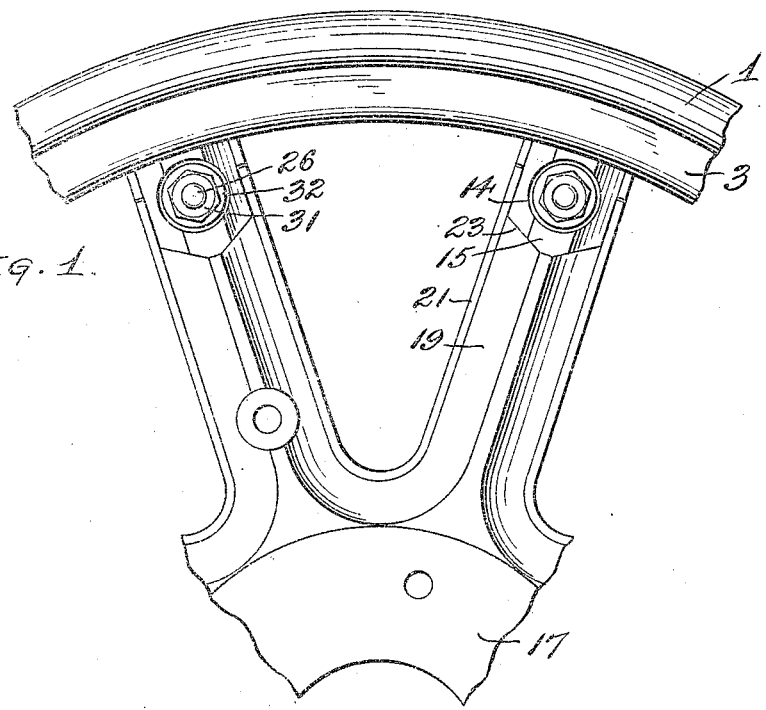
Figure 2:
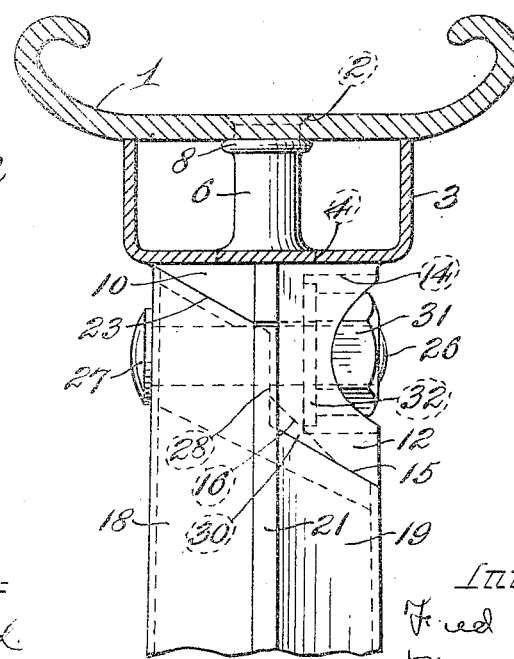

Referring to the drawings, Figure 1 is a side elevation of a portion of a wheel; Fig. 2 is a sectional view through the rim showing a part of one of the spoke portions in elevation; Fig. 3 is a view in section showing the rim spoke demountable structure in section with the parts separated as in the removal of the rim and felly; Fig. 4 is an end view of one of the spoke portions; Fig. 5 is a sectional view upon the line 5—5 of Fig. 3 looking in the direction of the arrows; Fig. 6 is a section upon the line 6—6 of Fig. 3 looking in the direction of the arrows; Fig. 7 is a top plan view of the rim clamping member with the rim and felly removed; Fig. 8 is a sectional view on the line 8—8 of Fig. 3 looking in the direction of the arrows; and Fig. 9 is a sectional view on the line 9—9 of Fig. 3 looking in the direction of the arrows.

In the embodiment shown in the drawings, 1 represents a rim of any preferred type provided with countersunk openings 2 placed at intervals around the same. Within the rim 1 is a stamped felly 3 presenting the appearance of the ordinary wood felly and provided at its inner periphery with openings 4 in alinement with the openings 2 of the rim. These openings receive the spoke clamping members which are carried by the felly and rim structure.

The rim and felly spoke clamping member comprises a body portion 5 provided with a shank 6 adapted to extend inside of the felly, a shoulder 7 for engagement in the opening 4, and a bead 8 forming an end portion 9, adapted to be swaged into the countersunk opening 2. The body portion 5 of this clamping member is provided with a rearwardly extending incline portion 10, having a groove or recess 11 therein, such recess having inclined sides as shown in Fig. 8. On the opposite side of the center the body portion 5 is provided with downwardly extending portions 12 having a bolt opening 13, a nut socket 14 and an inclined lower face 15. This lower inclined face 15 has the same inclination as the rearwardly extending portion 10, but the surface is broken at the rear by an inwardly extending V-shaped notch 16 as shown in Fig. 9.

The web of the wheel comprises a hub 17 arranged within the spoke structure which consists of a sheet metal rear plate 18 and a front sheet metal plate 19, these plates being somewhat V-shaped in cross section with flanges 20 and 21, which are beaded together one over the other to secure the plates together at the edges of the spokes and at the center. I preferred to make the flange 21 wider than the flange 20 and to bead this flange 21 around the latter as is clearly shown in Fig. 4.

The clamp structure at the end of each spoke portion will now be described. The rear stamping of each spoke portion extends out to a point which fits nicely inside of the felly 3, and the sides of the V-shaped stamping are inclined to correspond to the inclination of the inclined portion 10 of the rim and felly clamping member, while the forward plate portion of each spoke portion of the web has its sides inclined upward to correspond with the face 15 as is clearly shown in Fig. 3. Within the opening formed by the front and rear plates of each spoke portion is a filler block 22 fitting tightly within the spoke portion and having an inclined face 23 for engagement with the inclined face of the inclined portion 10. This face is interrupted by a suitable bead 24 corresponding to and adapted to fit into the recess 11. This filler block below this face is provided with an opening 25 receiving a clamping bolt 26 provided with a head 27 engaging outside of the rear half of the spoke portion and adapted to pass into the opening 13 of a corresponding rim and felly clamping member. At the junction of the front and rear halves of each of the spoke portions the filler block has an abrupt vertical face 28, as shown in Fig. 3, for engagement with the corresponding abrupt face about the opening 13, and below this it meets an inclined face 29 corresponding to the face 15 of the rim and felly clamping member. This face is also interrupted by an upwardly extending bead or ridge 30 which is inclined and conforms to the configuration of the recess 16 in the face 15. A suitable nut 31 and washer 32 are adapted to fit into the socket 14 and engage the threaded end of the bolt 26.

By the arrangement of the parts as described it will be seen that the rim and felly structure together with the spoke clamping members carried thereby, may be readily removed from the web structure by removing the nuts 31 and washers 32. When the parts are secured together, however, the rim and felly structure is firmly held in place against the radial and circumferential movement, the relative movement of the rim structure and web being over come by the inclined faces of the engaging parts and the circumferential displacement by the bolts 26 together with the beads and coöperating recesses arranged on the inclined faces.

The feature of having the clamping members projecting inwardly from the inner periphery of the felly and the individual clamping members on the ends of the spokes for coöperation therewith provides a structure wherein the appearance of the wheel is greatly improved in that there are no unsightly bolts or projections extending from the side of the felly as in many of the demountable rim wheel structures.

Having described my invention, I claim:—

1. A wheel comprising a rim, a stamped sheet metal felly, a plurality of clamping blocks extending inward therefrom and having shanks secured to the felly, and inclined clamping faces in different planes, a stamped sheet metal web structure having hollow spoke portions, a filler block in the end of each spoke portion the block and the end of the spoke portion having inclined faces for coöperation with the inclined faces of the corresponding rim and felly clamping member, and clamping means arranged between the coöperating clamping members.

2. A wheel comprising a rim, a stamped sheet metal felly, a plurality of clamping blocks having shanks securing the felly to the rim, and inclined clamping faces in different planes, a stamped sheet metal web structure having hollow spoke portions, a filler block in the end of each spoke portion having inclined faces for coöperation with the inclined faces of the corresponding rim and felly clamping member, a projection carried by one of said coöperating clamping members and engaging in a suitable recess of the other, and clamping bolts passing through both parts of each complete clamp.

In testimony whereof I affix my signature in presence of two witnesses as follows.

FRED TAYLOR.

Witnesses:
G. O. FARQUHARSON,
D. TOZER.